United States Patent

Winkler et al.

[11] Patent Number: 5,403,615
[45] Date of Patent: Apr. 4, 1995

[54] PROCESS FOR PRODUCING SOLDERABLE ENAMEL COATINGS ON METALLIC WIRES

[75] Inventors: Diethard Winkler; Rainer Krause; Achim Gläser, all of Wuppertal, Germany

[73] Assignee: Herberts GmbH, Wuppertal, Germany

[21] Appl. No.: 91,397

[22] Filed: Jul. 13, 1993

Related U.S. Application Data

[63] Continuation of Ser. No. 732,816, Jul. 19, 1991, abandoned.

[30] Foreign Application Priority Data

Jul. 20, 1990 [DE] Germany ............... 40 23 061.9

[51] Int. Cl.⁶ .............................................. B05D 5/12
[52] U.S. Cl. .................................. 427/117; 427/388.1; 427/388.2; 427/434.5; 427/434.7; 427/435
[58] Field of Search ............... 427/117, 434.7, 388.1, 427/434.5, 388.2, 435

[56] References Cited

U.S. PATENT DOCUMENTS

| | | | |
|---|---|---|---|
| 4,070,509 | 1/1978 | Garner et al. | 427/388.2 |
| 4,518,633 | 5/1985 | Walling | 427/434.7 |
| 4,533,598 | 8/1985 | Downey et al. | 427/117 |
| 4,542,049 | 9/1985 | Tolhurst et al. | 427/388.2 |
| 4,867,775 | 9/1989 | Cain | 65/3.43 |

*Primary Examiner*—Janyce Bell
*Attorney, Agent, or Firm*—Schweitzer Cornman & Gross

[57] ABSTRACT

Process for the preparation of coatings on wires or fiber-like materials, in which hydroxyl-containing polymers having a number-average molecular weight of 250 to 1,000, a hydroxyl number of 130 to 750 and an acid number of 0 to 150 are mixed in the liquid state with polyisocyanates having a number-average molecular weight of 200 to 2,000 in the liquid state immediately before application, so that 0.5 to 1.5 isocyanate groups are present for each hydroxyl and carboxyl group, and are fed to a wire or fiber-like material which is in a continuous forward movement in an amount which corresponds to that immediately consumed, and a device suitable for the process and comprising capillary tubes through which the mixture is fed to the wire or fiber-like material.

4 Claims, 2 Drawing Sheets

PROCESS FOR PRODUCING SOLDERABLE ENAMEL COATINGS ON METALLIC WIRES

This is a continuation application of U.S. Ser. No. 732,816, filed on Jul. 19, 1991, now abandoned.

BACKGROUND OF THE INVENTION

The invention relates to the preparation of coatings on wires or fiber-like materials, such as glass fibers, for example for obtaining insulations on electrically conducting wires, in particular for obtaining solderable enameled wires or for preparing coated glass fibers.

The use of polyurethane coatings for electrical insulation of copper winding wires is known. This type of wire enamel is used extensively for the preparation of easily tin-coatable and thus solderable enameled wires for the electrical industry.

The preparation of polyurethanes from hydroxyl-containing polymers and polyisocyanates is generally known from DE-A-728 981. DE-A-756 058 describes the preparation of coatings, also including those on wires, by leading the wires through a solvent-containing bath of an enamel based on hydroxyl-containing polymers and polyisocyanates. In practice, the baths and the process proved to be unsuitable, since only coatings having different layer thicknesses could be obtained. For this reason, blocked polyisocyanates were developed which were said not to have this disadvantage (O. Bayer: Neuere Entwicklungen des Diisocyanat-Polyadditions-Verfahrens (Recent Developments in Diisocyanate Polyaddition Processes)/FATIPEC 1957, p. 14 and 15 and Houben-Weyl, 1962, vol. 14/2, p. 78 and BAYER-Produkte für die Elek-troisolierung (BAYER Products for Electrical Insulation), item 1.1/2 to 1.1/3, version 1987).

In practice, enameled wires are still prepared by using combinations of hydroxyl-containing polymers, such as, for example, polyester resins together with phenol-blocked polyisocyanates in a joint solution. Blocking of the polyisocyanate component affords protection against premature gelling of the coating and results in a sufficient shelf life of these single-component coatings. A typical example of phenol-blocked polyisocyanates is the adduct of trimethylolpropane with diisocyanatotoluene and phenol (Desmodur AP®), such as is described in Houben-Weyl, 1962, vol. 14/2, p. 67. Typical solvents for these coatings are technical grade cresols in a mixture with aromatic hydrocarbons. The coatings usually have a solids content of about 25–35%.

The enameled wires are usually prepared by several continuous applications of the wire enamel onto the metallic wire by means of felt or die wiping. After each application, the coating is cured at temperatures between 300° and 500° C. The phenolic blocking agent is eliminated during the crosslinking process and leaks out of the coating film. Temperature and residence time in the wire-enameling oven depend on the diameter of the wire and the structural design of the oven.

The use of phenolic solvents and blocking agents has disadvantages. The formulation of completely cresol-free, environmentally friendly polyurethane wire enamels is not possible, since even in a cresol-free solution the phenolic blocking agent is released during curing. During the curing process, additional energy has to be expended for eliminating the blocking agent.

The high temperature of 300° to 500° C. in the wire-enameling oven, which is necessary for film formation, can lead to pyrolytic degradation reactions already during the baking process with the elimination of isocyanates and amines.

Various experiments to prepare cresol-free wire enamels based on blocking agents other than phenol/-cresol are described in DE-A-2 404 740, 2 545 912, 2 626 175, 2 632 037 and 2 840 352. These processes have technological disadvantages and have not been successful.

If alcoholic blocking agents are used, such as are described, for example, in DE-A-26 26 175, their de-blocking temperature is increased even further and the risk of thermal damage during curing becomes greater.

DE-A-25 45 912 describes the use of lactam-blocked polyisocyanates. The caprolactam which is eliminated during the baking process condenses in the cooler waste air ducts of the wire-enameling oven and has to be removed from there by mechanical means. The obtainable coating rates are reduced compared with those of the phenol-blocked isocyanates.

The Applicant's DE-A-20 22 802 describes a process for the preparation of a plastic cover for metallic wires. To this end, a film bubble of thermosetting resin is extruded onto a hollow mandrel, the electric conductor being taken off at a higher rate. In the case of resins present as a liquid, they are completely or partly prereacted in order to obtain the necessary viscosity at the die head. Crosslinkable plastics of this type mentioned also include reaction products of polyisocyanates with hydroxy polyesters. However, the high viscosity causes an undesirable stretching of the wire and even wire cracks as a result of high tensile forces, especially in the case of thin wires.

SUMMARY OF THE INVENTION

The object of the invention is to provide a process for the preparation of coatings or for coating wires and fiber-like materials, which results in uniform coatings and can be carried out without the risk of the emissions of toxic cleavage products or large amounts of solvents. The process is in particular intended to lead to solderable insulated conductive wires, such as copper wires. It is also intended to provide enamels for the process and devices suitable for this process.

It has been found that this object can be achieved by a two-component technique (2K technique), such as has previously not been known for the coating of wires and fiber-like materials.

Accordingly, the invention relates to a process for the preparation of coatings on wires or fiber-like materials by coating with liquid mixtures comprising hydroxyl-containing polymers and polyisocyanates, followed by curing, which process comprises mixing A) one or more hydroxyl-containing polymers having a number-average molecular weight of 250 to 1,000, a hydroxyl number of 130 to 750 and an acid number of 0 to 150, in the liquid state with B) one or more polyisocyanates having at least two free isocyanate groups and a number-average molecular weight of 200 to 2,000, preferably 200 to 900, in the liquid state, continuously before application to the wire or the fiber-like material in such a ratio that 0.5 to 1.5 isocyanate groups are present per hydroxyl and carboxyl group, it being possible for components A and/or B to contain catalysts and/or customary paint additives, and feeding this mixture continuously to each individual, continuously forward moving wire or fiber-like material in an amount which is equivalent to the amount immediately consumed.

The amount immediately consumed is, in the process according to the invention, a result of the rate of forward movement of the wire or fiber-like material and the desired layer thickness of the coating.

The liquid state of components A and B, which are mixed with one another in the process according to the invention immediately before application, can be achieved in various ways:

(a) liquid polymers or polyisocyanates can be used at the application temperature, for example room temperature, (b) components A and/or B can be heated until the desired liquid state, i.e. the desired application viscosity, has been reached, (c) small amounts of solvent can be added to component A and/or component B, possibly with heating in order to obtain the liquid state.

In the process according to the invention, the mixture of the active components A and B is fed to the wire or fiber-like material to be coated immediately after mixing in an amount which corresponds to that immediately consumed. It has proven particularly favorable and is therefore a preferred embodiment of the invention to feed the mixture to the individual wires or fiber-like materials through capillary tubes. This can be effected, for example, by leading the wires or fiber-like materials to be coated through a funnel-like coating device at the end of which a wiping device is present and into which the mixture is introduced in each case through a capillary tube into the wider-mouth orifice. In this manner, an amount which exactly corresponds to the consumption caused by the rate of the substrate to be coated and the layer thickness can be metered in.

The process according to the invention makes it possible to coat wires, in particular electrically conducting wires, such as, for example, copper wires of various cross-sections, or provide them with insulating coatings. Copper wires coated in this manner can be soldered, since the coating film is decomposed when the enameled wire is dipped into a hot soldering bath and the wire can thus simultaneously be coated with solder. Furthermore, the procedure according to the invention makes it possible to coat any fiber-like materials, such as, for example, glass fibers, carbon fibers or various plastic fibers.

It has been found that the process according to the invention is particularly economical and environmentally friendly compared with the previous single-component process using fully blocked polyisocyanates. It is not necessary to eliminate during the baking process an expensive blocking agents which are damaging to the environment. Solvents are not or only in small amounts needed as flow-improving agents. Phenolic solvents are undesirable for reasons of environmental protection. The coating rate can be substantially increased compared with the previously known processes, while maintaining the same baking temperatures. Thus, the economy of a wire coating plant is increased at the same time. Moreover, the enameled wire or the fiber is subjected to lower thermal stress, which benefits the quality of the coating and the fiber.

The mixing ratio can be varied by changing the feed rates of the individual components A and B. This makes it possible to produce enameled wires and coated fibers having a broad spectrum of properties in a simple manner. In a preferred embodiment, the hydroxyl-containing component A also contains carboxyl groups in addition to hydroxyl groups. This makes it possible to obtain insulating coatings having improved thermal resistance. At a suitable ratio of hydroxyl to carboxyl groups, the soldering time deteriorates only insignificantly.

Examples of suitable hydroxy-functional components A having average molecular weights of 250–1000, hydroxyl numbers of 130–750 and acid numbers of 0–150 are:

polyester resins prepared from polycarboxylic acids and polyols by known processes, polyether polyols; for example the reaction products of diols and/or triols with ethylene oxide and/or propylene oxide, hydroxy-functional urethane prepared from polyisocyanates and an excess of polyalcohols, or mixtures thereof. If mixtures of different compounds are used, the definition of average molecular weight, hydroxyl number and acid number applies to the entire mixture. The hydroxy-functional component A must contain at least two hydroxyl groups per molecule. If component B is selected from the group comprising diisocyanates, it is favorable if at least a portion of component A is tri-or higher-functional.

Preference is given to polyester resins prepared from polyalcohols and polycarboxylic acids by known processes. The preparative methods of these polyester resins are described, for example, in Houben-Weyl, 4th edition, 1963, vol. 14/2, p. 1–41. The properties can be varied within wide limits by suitable selection of the raw materials.

The carboxyl groups can be incorporated by stopping the esterification reaction with polycarboxylic acids at the desired acid number. A further possibility is to add carboxylic anhydride compounds to substantially carboxyl-free polyester resins. At reaction temperatures of about 50° to 150° C., the acid semiesters are formed. Examples of suitable anhydride compounds are trimellitic anhydride, phthalic anhydride, maleic anhydride or succinic anhydride.

Examples of polyols are ethylene glycol, 1,2- and 1,3-propanediol, 1,4- and 1,3-butanediol, 1,5-pentanediol, 1,6-hexanediol, neopentylglycol, 1,4-bis(hydroxymethyl)cyclohexane, diethylene glycol, triethylene glycol, higher-molecular-weight ethers of ethylene glycol or propylene glycol, glycerol, trimethylolethane, trimethylolpropane, tris(hydroxyethyl) isocyanurate.

Instead of the polyols, it is also possible to use compounds all of which or some of which have low molecular weight and contain epoxy rings and react with carboxylic acids to give esters.

Since secondary hydroxyl groups react more slowly in the esterification reaction and the isocyanate addition reaction than primaryhydroxyl groups, the reactivity can be controlled by suitable selection of the polyols. In particular in the case of polyester resins having hydroxyl numbers of more than about 300 or molecular weights of more than about 450, it is often advantageous to introduce some of the hydroxyl groups in the form of secondary hydroxyl groups. This can be effected, for example, via 1,2-propanediol or glycerol. Surprisingly, this gives shorter soldering times.

Suitable polycarboxylic acids are also those compounds which can be incorporated under the reaction conditions by condensation like carboxylic acids, such as, for example, their anhydrides and esters.

Examples are phthalic anhydride (PAH), isophthalic acid (IPA), dimethyl terephthalate (DMT), succinic acid, maleic anhydride (MAH), adipic acid, sebacic acid, azelaic acid, tetrahydrophthalic anhydride (THPAH), hexahydrophthalic anhydride, trimellitic acid (TMA), trimellitic anhydride (TMAH), butanetetracarboxylic acid or pentaneteracarboxylic acid.

Dicarboxylic acids and hydroxycarboxylic acids containing five-membered imide rings are also suitable. These compounds can be prepared by known processes, for example, from cyclic carboxylic anhydrides which, apart from the cyclic anhydride group, contain at least one further anhydride or carboxyl group, by reaction with aminocarboxylic acids, aliphatic or aromatic diamines or lactams. Examples are:

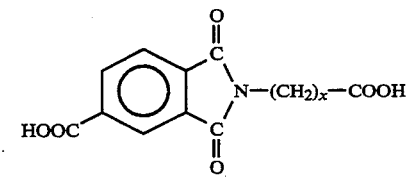

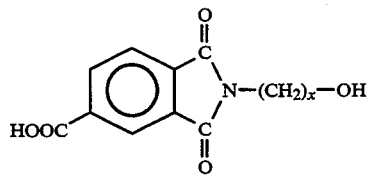

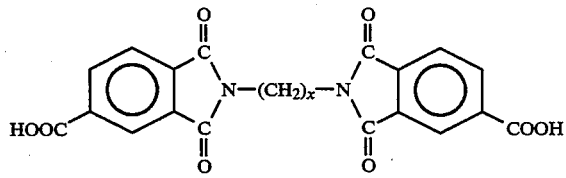

Furthermore, the polyester resins can also contain amide groups, for example by incorporation of diamines, amino alcohols or cyclic amides, such as caprolactam, by condensation. Instead of the polycarboxylic acids and polyalcohols, it is also possible to use hydroxycarboxylic acids or cyclic lactones.

The relative amounts of polycarboxylic acids and polyalcohols are chosen such that polyester resins having average molecular weights of 250 to 1,000, acid numbers of 0 to 150 and hydroxyl numbers of 130 to 750 are obtained. Preference is given to condensation products having average molecular weights of 300 to 500, acid numbers of 5 to 80 and hydroxyl numbers of 200 to 450. Particular preference is given to polyester resins having acid numbers of 10 to 30.

Suitable polyether polyols are reaction products of diols and triols with ethylene oxide and propylene oxide, such as are described, for example, in Houben-Weyl, 4th edition; 1963, vol. 14/2, p. 436 to 450. Carboxyl groups can be incorporated by reaction with anhydride compounds.

Owing to their low viscosity, they are also excellently suitable for being combined with polyester resins. In this case, the definition of average molecular weight, acid and hydroxyl number applies to the entire mixture.

Suitable hydroxy-functional urethanes are reaction products of polyalcohols with polyisocyanates, such as are described, for example, in Houben-Weyl, 4th edition, 1963, vol. 14/2, p. 72 to 76. Suitable polyalcohols are the alcohols described for the preparation of the polyester resins. Ester polyols having at least two hydroxyl groups in the molecule are also suitable. After completion of the reaction of the polyalcohols with the polyisocyanates, carboxyl groups can be incorporated by reaction with polycarboxylic anhydride compounds at temperatures of, for example, 20° to 100° C.

The polyisocyanates for preparing the urethanes can be selected from the group described under polyisocyanate component B. Furthermore, they also include lower-molecular-weight polyisocyanates having molecular weights below 200, such as 2,4- and 2,6-toluylene diisocyanate, 1,3- and 1,4-phenylene diisocyanate and 1,6-hexamethylene diisocyanate.

Suitable polyisocyanate components of component B having at least two free isocyanate groups are aliphatic, cycloaliphatic, araliphatic, aromatic and heterocyclic polyisocyanates having molecular weights between 200 and 2,000, preferably 200 and 900, such as, for example, 4,4'-diisocyanatodiphenylmethane, 2,4'-diisocyanatodiphenylmethane, 4,4'-diisocyanatodiphenyl ether, 1-isocyanato-3,3,5-trimethyl-5-isocyanatomethylcyclohexane and 2,2,4- and 2,4,4-trimethylhexamethylene diisocyanate.

Further suitable polyisocyanates are for example those described in Houben-Weyl, 4th edition, 1963, vol. 14/2, p. 64 to 70:
  reaction products of polyisocyanates with a less than stoichiometric amount of polyalcohols,
  trimerization products of isocyanates
  carbodiimido-containing polyisocyanates
  reaction products having biuret structure
  uretdione-containing polyisocyanates.

Preference is given to oligourethanes having two to four free isocyanate groups per molecule and average molecular weights of 200 to 2,000, preferably up to 900. Polyisocyanates having molecular weights below 200 can also be used for preparing these oligourethanes. Preference is given to adducts of aromatic diisocyanates such as 2,4-and 2,6-toluylene diisocyanate.

It is also possible to use mixtures of different polyisocyanates in order to obtain certain properties.

If component A is selected from the group comprising compounds having only two functional groups (hydroxyl and/or carboxyl groups), it is favorable, if at least a portion of component B is tri- or higher-functional.

It is particularly favorable if at least a portion of both components A and B are tri- and higher-functional, in order to be able to achieve multidimensional crosslinking. It is favorable if, for example, at least 20 to 30 mol % of the sum of components A and B are tri- or higher-functional. In principle, up to 100 mol % can be tri- or higher-functional, and the optimum values can be determined by tests and can amount to 50 to 100 mol %. The ratio of the sum of hydroxyl and carboxyl groups to isocyanate groups is advantageously in the range from 1:0.5 to 1:1.5; i.e. either a less than stoichiometric amount or an excess amount of isocyanate groups can be present. Preference is given to a range between 1:0.9 and 1:1.3.

The coating mixture can additionally contain catalysts and/or other customary paint additives, for example flow-improving agents, stabilizers for controlling gelling time and combination resins, such as phenolic resins, melamine resins, epoxy resins. Additives of this type are preferably admixed to component A.

The crosslinking rate can be increased by addition of the known catalysts for the polyurethane reaction. This makes it possible to further reduce the oven temperature or increase the coating rate.

Examples of suitable catalysts are quaternary ammonium salts of Mannich bases, such as 2-(trimethylammoniomethyl)cyclohexanone chloride, tertiary ammonium salts of organic acids, such as triethylammonium trichloroacetate, bis(trimethylammonium)oxalate, N-ethylmorpholinium acetate, organometallic compounds of lead, tin and zinc, such as tetraphenyllead, tetraethyllead, hexaphenylditin, hexa-n-butylditin, zinc octoate, reaction products of aniline and its derivatives with aldehydes, such as acetaldehyde, propionaldehyde or butyraldehyde.

Preferred catalysts are in particular the known so-called latent catalysts, which are not released until they reach a certain temperature and then become active.

The catalysts are usually used in an amount of 0 to 5% by weight, for example 0.1 to 5% by weight, preferably 0.3 to 1% by weight, relative to the total amount of components A and B.

Both components A and B can be present either in solvent-containing or in solvent-free form. If solvents are used, they must not contain any groups which are reactive with isocyanate. The solvents serve in particular for improving the flow properties and should have boiling points between 100° and 200° C., preferably 140° to 200° C. The concentration is kept at a minimum and can be kept particularly low when processing in the heat at temperatures of up to about 50° C. As a rule, at most 40% by weight, preferably up to 30% by weight, and particularly preferably up to 10% by weight, of solvent, relative to the entire coating agent, are sufficient. Accordingly, the coating agents used according to the invention are distinguished by a low solvent content compared with the previously used wire enamels.

Examples of solvents which can also be used as flow-improving agents are:

glycol esters, such as methoxypropyl acetate, ethoxypropyl acetate, butylglycol acetate, propylene glycol diacetate, glycol ethers, such as diglycol dimethyl ether, glycol methyl tert-butyl ether, glycol ethyl tert-butyl ether, glycol butyl tert-butyl ether, diglycol methyl tert-butyl ether, aromatic hydrocarbons, such as toluene, xylene, Solvesso 100 ®, Solvesso 150 ® (Solvesso=aromatic hydrocarbon mixtures), ketones, such as cyclohexanone, methyl isobutyl ketone, methyl isoamyl ketone, and mixtures thereof.

Further paint additives, such as antifoams, agents for influencing the surface tension, and the like, can be added, for example, in amounts of 0 to 10% by weight, relative to the entire coating agent.

Each of the two components A and B can be stored by itself in a sealed container. Directly after mixing, the crosslinking reaction begins in combination with an increase in viscosity and leads to gelling, in the case of the coating mixtures according to the invention, in about one to several hours. Owing to this steady change in viscosity, the conventional wire-coating devices which convey the ready-to-use coating mixture from a storage tank to the wire via rotating rolls and die or felt wipers are unsuitable for the coating preparations according to the invention.

Accordingly, the two components are mixed in the process according to the invention continuously and immediately before applying them to the electric conductor. Only the amount of enamel actually consumed is fed to each individual wire per time unit.

A suitable application system is shown, for example, in FIG. 1. In FIG. D 1 is the storage tank for component A, 2 the storage tank for component B, 3 and 6 storage tanks for for rinsing dilutions, 4 and 5 valves or stop valves, such as, for example, three-way valves, 7 and 8 are pumps, 9 a mixing device, 10 an enamel distributor, 11 transport lines in the form of capillaries or capillary-like borings and 12 the application device.

The device usable according to the invention substantially comprises three parts, i.e. the mixing device, an enamel distributor and transport lines, which lead from the enamel distributor to the appropriate application device. In the embodiment of FIG. 1 given as example, the mixing device is designated by 9, the enamel distributor by 10, the transport lines by 11 and the application device by 12.

Using such a device, components A and B can be mixed continuously in defined ratios immediately before being applied to the wire. The enamel mixture is fed separately to each application device and in an amount exactly corresponding to its consumption. The transport path from the mixing device to the application device is kept short.

DETAILED DESCRIPTION OF THE INVENTION

An example of a commercially available two-component processing plants suitable for preparing the enamel mixture is Eldo-Mix from Hilger+Kern. Components A and B are each conveyed separately from their storage tanks (in the example of FIG. 1: numbers 1 and 2) to the mixing device (in the examples: FIG. 9) and thoroughly mixed there.

The pumps (in the example of FIG. 1: numbers 7 and 8) can operate continuously (gear pumps) or discontinuously (piston pumps). The delivery amount of each pump per time unit can be adjusted via engine speed and transmission ratio to be variable. This makes it possible to set the mixing ratio and the amount of enamel delivered per time unit to the application device to a fixed value. The delivery amount is set to such a value that it exactly corresponds to the amount of enamel consumed in the application devices.

By changing the engine speed of the pumps, it is possible to vary the mixing ratio of coating components A and B and, if necessary, adjust them to different requirements. By changing the storage tanks of components A or B, it is possible to exchange the enamel mixture quickly for a new grade variant.

Figure 3:
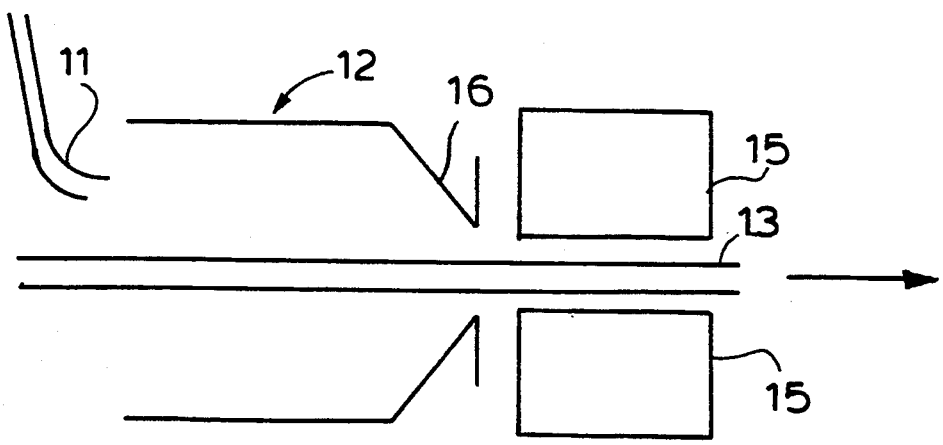
FIG. 3 is a schematic diagram of an alternate enamel application for use in practicing the invention.

If desired, the delivery of components A and B can be stopped upstream of the pumps by means of valves (in the example the FIG. 1: numbers 4 and 5) and change to delivery of rinsing dilution from the separate containers (in the example: FIGS. 3 and 6). This is necessary, for example, when the coating process is interrupted or finished. The rinsing dilutions used are usually inert solvents compatible with components A and B, such as, for example, those described above.

The components in the mixing device can be mixed mechanically or statically. For example, commercially available static mixing pipes which effect excellent homogenization by means of flow separation and radial mixing have proved suitable.

Figure 1:
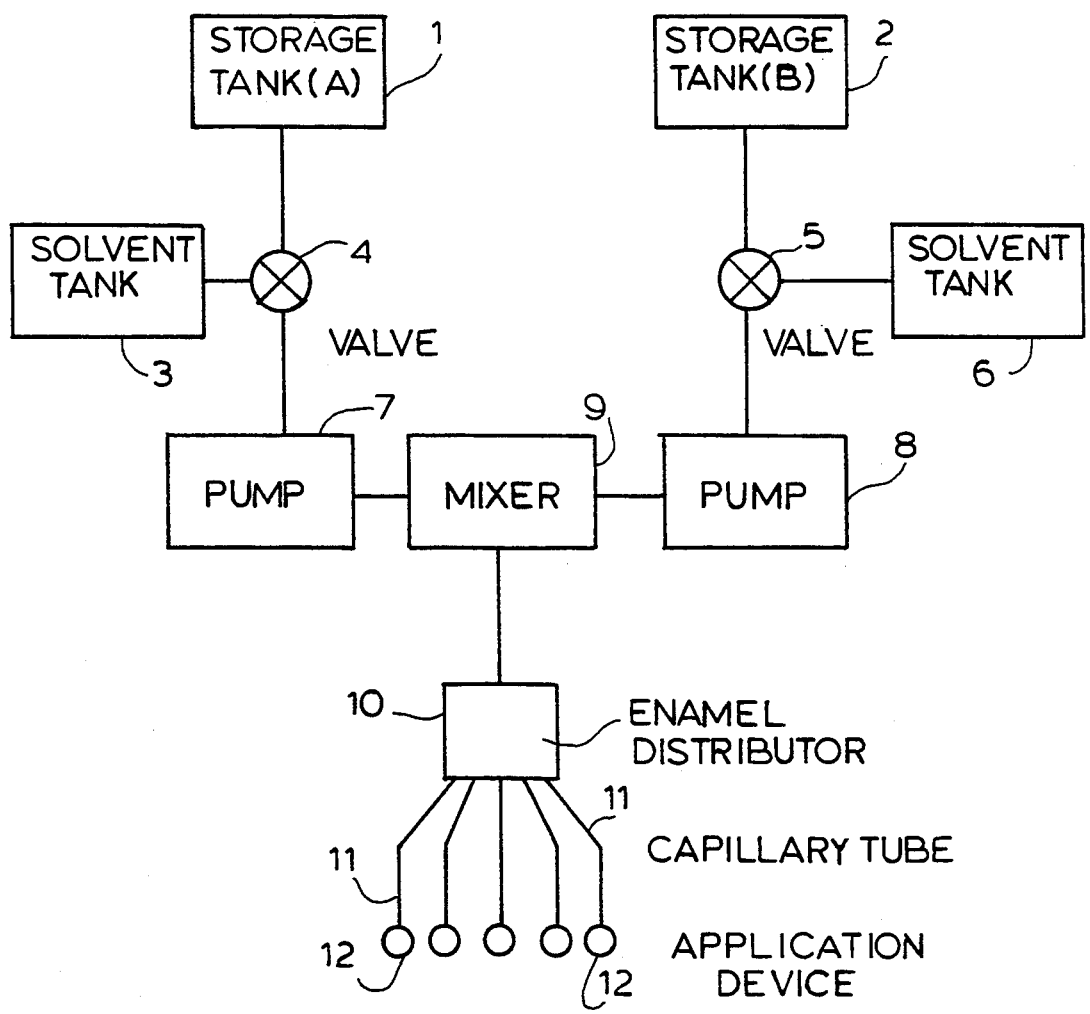
FIG. 1 is a schematic diagram of an application system according to the present invention.

The mixing device is followed by an enamel distributor (in the example of FIG. 1: number 10). The homogenized enamel is separated here for delivery to the individual application devices. The path between mixing device and application device is kept short.

The enamel distributor preferably comprises a short piece of tubing into which flexible capillary tubes, for example made of stainless steel, are inserted. The use of capillary tubes allows a flexible and selective delivery of enamel to the application devices and is therefore a preferred embodiment of the invention.

The designations capillaries, capillary tubes or capillary-like borings here mean tubes or tube-like materials, in particular metal tubes, having an internal diameter of 0.1 to 2.0 mm. The internal diameter is mainly determined by the flow out-rate (about 0.2 to 10 ml/min) and the viscosity of the enamel. The length of tube is determined by local machine conditions; it is for example 1-100 cm. Devices similar to capillaries can also be made using bored metal or plastic materials. The effect of such devices is based on the fact that relatively high flow rates (1-100 cm/sec) can be achieved for small amounts of liquid. This ensures that the mixed components do not react in the delivery system and thus clogging can be prevented. The number of capillaries or borings is determined by the number of wires to be coated (wire passages).

An example of a suitable device operates, for example, with the following characteristic values for capillaries or capillary-like borings:
internal diameter 0.05 cm
length 40 cm
quantity 7
flow out-rate 0.2-5 ml/min
flow rate 1.7-42 cm/sec.

The length of the capillaries can be variable and adjusted to the requirements. The designation "enamel distributor and capillaries" is understood to mean, for example, a piece of tubing provided with narrow, capillary-like borings and arranged directly above the application device or the application devices.

Between the enamel distributor and the application device, mechanically or electromagnetically controllable stop valves can additionally be arranged in order to adjust the feed of enamel exactly to the consumption of each individual application device. Furthermore, in the case of highly viscous enamel mixtures, the viscosity can be lowered by means of a heating device for the capillary tube. The small line diameter allows good heat transfer.

Figure 2:
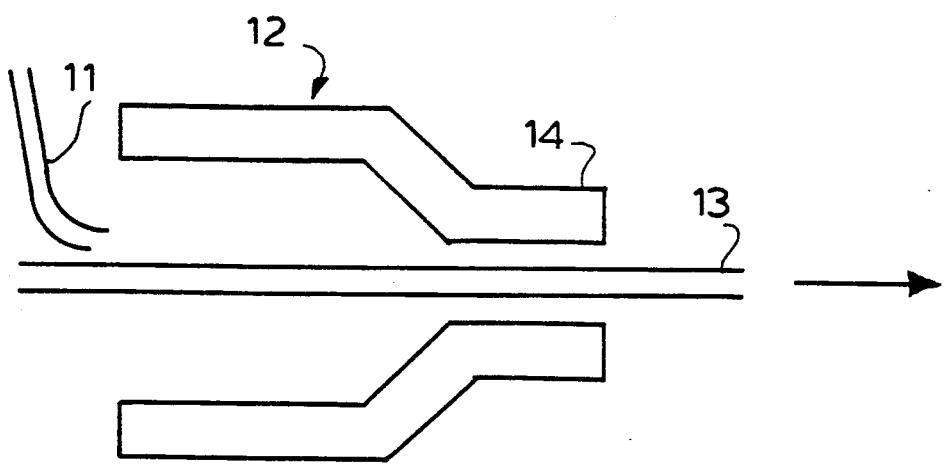
FIG. 2 is a schematic diagram of an enamel application for use in practicing the invention.

The enamel is applied centrically to the wire in an exactly defined amount by means of the application device. Examples of application devices which can be used are the die or felt wipers of the prior art (examples of which are shown in FIGS. 2 and 3. In FIGS. 2 and 3, examples of application devices are shown, such as are mentioned in FIG. 1, for example under the number 12. In FIGS. 2 and 3, 11 is the capillary tube, 13 the wire to be coated or the fiber to be coated, 14 a die wiper and 15 a squeezing felt). When squeezing felts are used, (for example FIG. 15 in FIG. 3), it is advantageous to install before the passage through the felt wiper a conical funnel 16 which takes up the amount of enamel delivered.

As a rule, a plurality of application devices is used in order to apply the insulating enamel in several layers until the desired increase in enamel has been reached. Each enamel layer is cured before the next application in a drying oven at a temperature of about 250° to 500° C. The degree of baking is controlled by the take-off rate and the oven temperature.

During each application of enamel, the layer thickness is adjusted, for example, by die wiper (FIG. 2) or squeezing felt (FIG. 3). The enamel is preferably conveyed directly via capillary tubes into a funnel-like opening at the application device in an amount which corresponds exactly to the amount consumed, so that the funnel is always full but does not overflow. The enamel can also be trickled directly onto the wire upstream of the application device, which then conveys it further. If several mixing devices are used in which the mixing ratios or composition of components A and B are different, it is also possible to produce multi-layered structures having a broad spectrum of properties.

The invention also relates to the device described above. It is suitable not only for carrying out the process according to the invention but also for the coating of wires and fiber-like materials or fibers with coating agents consisting of two-component systems, systems of this kind consisting either of individual components which as such are liquid, if necessary with heating, or are liquid by virtue of addition of solvent, if necessary also with heating.

The process according to the invention and the device according to the invention make it possible to provide wires and fiber-like materials, such as various fibers, for example glass fibers, carbon fibers, plastic fibers, in a simple manner with uniform coatings, in which the elimination of undesirable byproducts and the emission of solvents can be excluded or at least kept to a very low level. Electrically conducting wires can be provided according to the invention with insulating layers without any adverse effect on the solderability. Other wires or fibers, such as glass fibers, can be protected, for example, for protection against mechanical damage, for protection against corrosion or for protection against hydrolysis.

The invention is illustrated further by means of the examples and comparative experiments which follow. Parts and percentages are by weight, unless stated otherwise.

Comparative Experiment A 444 parts of glycerol, 306 parts of ethylene glycol, 672 parts of dimethyl terephthalate and 0.2 part of zinc acetate are heated under nitrogen to 200° C., during which 220 parts of methanol are distilled off via a column. 576 parts of isophthalic acid are then added at 150° C.

The temperature is then increased to 210° C. over a period of 3 hours and maintained until an acid number of 14 is reached. During this time, 118 parts of water are distilled off. The clear resin has a hydroxyl number of 363. The calculated average molecular weight is 513.

114 parts of resin are dissolved in 127 parts of cresol and mixed with 460 parts of a 50% strength solution of a commercially available phenol-blocked polyisocyanate for polyurethane wire enamels (Desmodur AP ® stable) in cresol/xylene=2:1. The mixture is then diluted with 186 parts of Solvesso 100 ®, 62 parts of xylene and 50 parts of isobutanol. The enamel has a viscosity of 115 mPas at a solids content (1 h 180° C.) of 30.8%.

The enamel is applied to a copper wire 0.355 mm in diameter by means of dies in 8 passages and cured in a vertical oven 2.4 m in length at a circulating air temperature of 450° C.

The designation crack limit denotes the coating rate at which the coating no longer adheres to the wire due to insufficient crosslinking upon abrupt tearing. It is 50 m/min. The test values are listed in Table 1.

EXAMPLE 1

Preparation of component A:

120 parts of xylene, 185 parts of cyclohexanone and 550 parts of methoxypropyl acetate are added at 100° C. to 1,500 parts of the polyester resin from comparative experiment A. The solids content (1 h 180° C.) is 60%, and the viscosity is 1720 mPas.

Preparation of component B:

A commercially available 67% strength solution of a reaction product of trimethylolpropane with toluylene diisocyanate (Desmodur L 67 ®) is used as polyisocyanate component B.

Both components are delivered separately and continuously via electronically controlled precision gear dosing pumps to a mixing block by means of a static mixing tube. This gives a coating material having a solids content of 64% by weight. Further transport to the wiper dies takes place via 7 capillary tubes each 40 cm in length and 0.05 cm in internal diameter. The mixing ratio (parts by weight) of component A to component B is 0.92:1. The delivery rate of the enamel mixture is controlled via the pump speed such that no losses by dripping occur. Depending on the take-off rate of the wire, it is overall between 6 and 10 g/min. The diameter of the wire and the oven setting are the same as in comparative experiment A.

The processing rate is much higher compared with that of comparative experiment A. The test values are listed in Table 1.

EXAMPLE 2

Components A and B from Example 1 are mixed as described in Example 1. The mixing ratio of component A to component B is set to 0.74:1 (parts by weight). The test values are listed in Table 1.

EXAMPLE 3

Components A and B from Example 1 are mixed as described in Example 1. The mixing ratio of component A to component B is set to 0.55:1 (parts by weight). The test values are listed in Table 1.

Comparative Experiment B

Preparation of component A:

148 parts of phthalic anhydride and 130 parts of ethylene glycol are heated to 200° C. The water of reaction eliminated distills off via a column. The temperature is maintained at 200° C. until an acid number of 2 is reached. The hydroxyl number is 470 mg of KOH/g and the calculated average molecular weight is 235. The mixture is then diluted with 85 parts of methoxypropyl acetate. Preparation of component B:

A mixture of 174 g (1 mol) of toluylene diisocyanate and 168 g (1 mol) of hexamethylene diisocyanate is used as polyisocyanate component B.

Both components are mixed as described in Example 1 and applied to the wire. The mixing ratio of component A to component B is 1.84:1 (parts by weight).

The coated wire adheres to the deflection wheels of the wire coating oven and cracks. Varying the coating rate and oven temperature does not lead to an improvement either.

Comparative Experiment C

Component A is the same as in comparative experiment B. A commercially available 67% strength solution of a reaction product of trimethylolpropane with toluylene diisocyanate (Desmodur L 67 ®) is used as polyisocyanate component B. The mixing ratio of component A to component B is 0.48:1 (parts by weight).

As in comparative experiment 2, the coated wire adheres to the deflection wheels of the coating oven and cracks. Varying the coating rate and oven temperature does not lead to an improvement either.

EXAMPLE 4

Preparation of component A:

200 parts of isophthalic acid, 46 parts of glycerol, 67 parts of trimethylolpropane and 124 parts of ethylene glycol are heated to 210° C. The water of reaction eliminated distills off via a column. The temperature is maintained at 210° C. until the acid number has dropped to 10. 118 parts of phthalic anhydride are then added. The reaction temperature is now maintained at 200° C. until an acid number of 2 is reached. After cooling to 130° C., 50 parts of xylene, 50 parts of cyclohexanone and 120 parts of methoxypropyl acetate are added. The hydroxyl number is 340 and the calculated molecular weight is 490, in each case relative to solvent-free resin. After cooling to 90° C., 20 g of trimellitic anhydride are added. The temperature is now maintained at 90° C. for 1 hour. After that, the hydroxyl number is 314 and the acid number 24, in each relative to solvent-free resin. The solution has a solids content of 70%.

Preparation of component B:

A commercially available 67% strength solution of a reaction product of trimethylolpropane with toluylene diisocyanate (Desmodur L 67 ®) is used as polyisocyanate component B.

Both components are mixed as described in Example 1 and applied to the wire. The mixing ratio of component A to component B is 0.86:1 (parts by weight). The test results are listed in Table 2.

EXAMPLE 5

Components A and B from Example 2 are mixed as described in Example 1. The mixing ratio of component A to component B is set to 0.69:1 (parts by weight). The test values are listed in Table 2.

EXAMPLE 6

Components A and B from Example 1 are mixed as described in Example 1. The mixing ratio of component A to component B is set to 0.57:1 (parts by weight). The test values are listed in Table 2.

TABLE 1

| | Comparative Example A | | Example 1 | | | Example 2 | | | Example 3 | | |
|---|---|---|---|---|---|---|---|---|---|---|---|
| Mixing ratio of component A to B (parts by weight) | | | 0.92:1 | | | 0.74:1 | | | 0.55:1 | | |
| Crack limit m/min | 50 | | 75 | | | 80 | | | 70 | | |
| Take-off rate m/min | 40 | 45 | 45 | 55 | 65 | 50 | 60 | 70 | 40 | 50 | 60 |
| Increase in diameter μm | 42 | 43 | 38 | 40 | 41 | 37 | 40 | 41 | 37 | 42 | 45 |
| Surface test values according to DIN 46453 | pass | pass | pass | pass | pass | pass | pass | pass | pass | pass | pass |
| Adhesion and flexibility 20% | pass | pass | pass | pass | pass | pass | pass | pass | pass | pass | pass |
| Heat shock 30 min 180° C. 1 × d | fail | fail | fail | pass | fail | fail | pass | pass | pass | pass | pass |
| tanδ steep rise °C. | 131 | 130 | 143 | 149 | 150 | 145 | 147 | 146 | 149 | 158 | 150 |
| Solderability at 370° C. s | 3.0 | 3.0 | 2.8 | 2.8 | 2.8 | 2.6 | 2.6 | 2.8 | 3.0 | 2.0 | 1.5 |
| Softening temperature °C. | 231 | 228 | 231 | 235 | 234 | 232 | 235 | 239 | 232 | 235 | 233 |

Diameter of conductor 0.355 mm
Oven temperature 450° C.

TABLE 2

| | Example 4 | | | Example 5 | | | Example 6 | | |
|---|---|---|---|---|---|---|---|---|---|
| Mixing ratio of component A to B (parts by weight) | 0.86:1 | | | 0.69:1 | | | 0.57:1 | | |
| Crack limit m/min | 70 | | | 75 | | | 70 | | |
| Take-off rate m/min | 45 | 55 | 65 | 45 | 55 | 65 | 45 | 55 | 65 |
| Increase in diameter μm | 39 | 40 | 40 | 38 | 40 | 42 | 38 | 41 | 40 |
| Surface test values according to DIN 46453 | pass | pass | pass | pass | pass | pass | pass | pass | pass |
| Adhesion and flexibility 20% | pass | pass | pass | pass | pass | pass | pass | pass | pass |
| Heat shock 30 min 180° C. 1 × d | fail | pass | pass | fail | pass | pass | fail | pass | pass |
| tanδ steep rise °C. | 142 | 141 | 140 | 143 | 145 | 146 | 149 | 148 | 148 |
| Solderability at 370° C. s | 2.7 | 2.5 | 2.4 | 2.3 | 2.2 | 2.4 | 2.8 | 2.6 | 2.6 |
| Softening temperature °C. | 227 | 230 | 229 | 239 | 237 | 233 | 242 | 239 | 239 |

We claim:

1. A process for preparing solderable enameled wire, which comprises:
   (a) continuously preparing a liquid state mixture of
      (i) a hydroxyl-containing polymer having a number average molecular weight of from 250 to 1,000, a hydroxyl number of from 130 to 750, and an acid number of from 0 to 150,
      (ii) a polyisocyanate having at least two free isocyanate groups, and a number average molecular weight of from 200 to 2,000, said mixture preparation being carried out at a ratio of from 0.5 to 1.5 isocyanate groups per hydroxyl and carboxyl groups in the mixture, the mixture optionally containing one or more of a catalyst, and a paint additive,
   (b) continuously supplying wire, and
   (c) immediately after mixing, continuously applying the mixture as a solderable coating to the wire, the amounts of the hydroxyl containing polymer and polyisocyante being mixture prepared substantially equal to the amount of the mixture applied at that time to the wire.

2. The process of claim 1, wherein said wire is of copper.

3. The process of claim 1, wherein said hydroxyl containing polymer and said isocyanate are brought to a viscosity required for application to the wire, by (i) heating, or (ii) adding a solvent to hydroxyl-containing polymer and the isocyanate until the viscosity is obtained.

4. The process of claim 1, wherein said applying comprises feeding the freshly prepared mixture through a capillary tube or bore to each wire to be coated.

* * * * *